United States Patent [19]

Ito et al.

[11] Patent Number: 5,282,444
[45] Date of Patent: Feb. 1, 1994

[54] POWER TRANSMITTING SYSTEM OF SMALL BOAT

[75] Inventors: Kazumasa Ito; Hiroshi Tasaki, both of Hamamatsu, Japan

[73] Assignee: Sanshin Kogyo Kabushiki Kaisha, Hamamatsu, Japan

[21] Appl. No.: 12,973

[22] Filed: Feb. 2, 1993

Related U.S. Application Data

[63] Continuation of Ser. No. 733,094, Jul. 19, 1991, abandoned.

[30] Foreign Application Priority Data

Jul. 23, 1990 [JP] Japan .................. 2-194493

[51] Int. Cl.$^5$ ............................................. F02B 75/06
[52] U.S. Cl. .............................. 123/192.2; 123/149 D; 74/574
[58] Field of Search ............. 123/192.1, 192.2, 149 D; 74/572, 573 R, 574; 475/646

[56] References Cited

U.S. PATENT DOCUMENTS

| | | | |
|---|---|---|---|
| 3,402,707 | 9/1968 | Heron | 123/192.2 |
| 3,563,223 | 2/1971 | Ishida | 123/192.2 |
| 4,174,698 | 11/1979 | Dupin | 123/192.2 |
| 4,195,613 | 4/1980 | Bratt et al. | 123/192.2 |
| 4,616,608 | 10/1986 | Shiga | 123/192.2 |
| 4,617,885 | 10/1986 | Oshiro et al. | 123/192.2 |
| 4,656,981 | 4/1987 | Murata et al. | 123/192.2 |
| 4,676,121 | 6/1987 | Kouno | 74/572 |

FOREIGN PATENT DOCUMENTS

| | | | |
|---|---|---|---|
| 158330 | 9/1984 | Japan | 123/192.1 |
| 1-237290 | 9/1989 | Japan | |
| 435367 | 7/1974 | U.S.S.R. | |

*Primary Examiner*—Noah P. Kamen
*Attorney, Agent, or Firm*—Ernest A. Beutler

[57] ABSTRACT

The invention provides a power transmitting system for a small boat, such as a water jet propulsion craft, and more particularly, an improved arrangement for connecting an engine output shaft to a propulsion unit input shaft. Also provided is an arrangement for balancing an engine within the craft against undesirable operational forces tending to render the craft unstable. The connecting assembly includes a coupling arrangement utilizing elastomeric vibration dampening members. One of the dampening members possesses a high degree of elasticity, while another of the dampening members possesses a low degree of elasticity. A durable, yet efficient vibration dampening coupling arrangement, which is additionally able to act as a universal joint, is thereby achieved. The engine balancing arrangement includes a flywheel which rotates in response to the crankshaft assembly of the engine. The flywheel is weighted, and rotates in a direction opposite to that of the crankshaft assembly, so that a rotational momentum is achieved by the flywheel to offset undesirable rotational forces created by the crankshaft assembly

16 Claims, 4 Drawing Sheets

POWER TRANSMITTING SYSTEM OF SMALL BOAT

This is a continuation of U.S. patent application Ser. No. 07/733,094, filed Jul. 19, 1991, now abandoned, entitled, POWER TRANSMITTING SYSTEM OF SMALL BOAT by the present inventors and assigned to the assignee hereof.

BACKGROUND OF THE INVENTION

This invention relates to an engine and a power transmitting system for a small boat, such as a water jet propulsion craft, and more particularly to an improved arrangement for connecting an engine output shaft to a propulsion unit input shaft and an arrangement for balancing the engine within the craft against undesirable operational forces tending to render the craft unstable.

The use of water jets for propulsion units in a wide variety of watercraft is well known. One of the more popular types of such watercraft is a small, single rider unit that is designed to be operated by a rider sitting in a straddle fashion and wearing a swimming suit. With this type of unit, the engine should be mounted at a generally forward location so as to improve the balance of the unit and provide sufficient room for the rider. However, it is also desirable for the water jet to be placed at the rear of the watercraft, and this means that its impeller is spaced a substantial distance from the driving engine. As a result, the drive shaft is very long and it is normally the practice to support the drive shaft by axially spaced bearings. There are often difficulties, however, in radially aligning the bearings, drive shaft, engine output shaft and impeller assembly. Unless properly aligned, the drive unit can cause undesirable vibrations which may be transmitted to the hull of the watercraft and cause discomfort to an operator.

When connecting an engine output shaft to an impeller shaft, it has been known to interpose a vibration dampening rubber coupling in order to prevent any rotational vibration of the output shaft from being transmitted from the engine to the impeller shaft. Also, it has been known, to divide the impeller shaft of the propulsion unit into two halves, a forward half and a rearward half, to be connected together through a key or spline coupling. Such a coupling is often journaled for rotation within a vertically extending bulkhead wall separating the engine compartment from the impeller assembly compartment. The coupling is journaled within a bearing assembly at the bulkhead wall. The bearing assembly is often provided with an elastomeric vibration dampening member between itself and the bulkhead wall in order to prevent engine vibrations from being transmitted to the hull.

While it is often desirable to utilize a soft rubber coupling between the engine output shaft and the impeller shaft, or a soft elastomeric mounting arrangement between the bulkhead wall and the bearing assembly rotatably journaling the power transmitting shaft arrangement, in order to maximize vibration dampening; the softness of the dampening members which may in fact be employed has been limited in order to secure a sufficient durability for such members. Thus, it has been unavoidable that some rotational vibration and engine vibration are transmitted to the craft's hull.

It is, therefore, a principal object of this invention to provide an improved arrangement for connecting an engine output shaft to a watercraft propulsion unit.

It is further an object of this invention to provide for improved vibration isolation capability in an elastomerically dampened coupling and support arrangement for the power transmitting shaft system of a small watercraft which also possesses a high degree of durability.

It is yet a further object of this invention to provide a durable, vibration dampened coupling and support arrangement for the power transmitting shaft system of a small watercraft which is capable of efficiently transmitting power from the craft's engine to the propulsion unit.

It has been known that reciprocating internal combustion engines give rise to numerous unbalanced forces that can cause vibration. The reciprocation of a piston within a cylinder generates one inertial force in accordance with the reciprocating movement of the piston. This inertial force is exerted upon the crankshaft and can cause vibrations unless balanced. In addition to these forces, it is a common practice in multiple cylinder engines to offset one cylinder and connecting rod from that of an adjacent bank. This is frequently done so that the connecting rods can cooperate with a single throw of the crank. When offset connecting rods are employed, a force couple is exerted on the crankshaft in addition to the force mentioned above. Of course, such force couples also can give rise to vibrations and shakes if not appropriately balanced.

It is well known to employ counterweights on the crankshaft throws so as to balance the inertial forces generated by the reciprocation of the pistons. In many instances, it is difficult or impossible to provide sufficient counterweighting directly on the crankshaft so as to dampen all such forces. This problem is particularly acute when the engine is extremely compact, which is always desirable. Additionally devices must be employed to balance the force couples. All of this balancing arrangement can often be extremely complicated and cumbersome.

A related problem involves the rotational momentum achieved by a crankshaft assembly of an engine when such forces are not adequately counterbalanced. Such rotational momentum can be imparted to an associated vehicle, such as a jet propelled watercraft, thereby tending to destabilize the craft during its operation upon a body of water.

It is, therefore, still a further object of this invention to provide an improved and simplified balancing arrangement for an internal combustion engine.

It is yet a further object of this invention to provide a simple and compact balancing arrangement which will counter rotational forces of a crankshaft assembly which would otherwise tend to destabilize a watercraft during operation.

SUMMARY OF THE INVENTION

A power transmitting system for a small boat, such as a water jet propulsion craft, is provided. The system includes a crankshaft-side coupling member and an intermediate coupling member. The intermediate coupling member is located adjacent to the crankshaft-side coupling member. A propulsion unit-side coupling member is provided on the other side of the intermediate coupling member. A first elastic dampening member interposed between the crankshaft-side coupling member and the intermediate coupling member. A second elastic dampening member interposed between the intermediate coupling member and the propulsion unit-side coupling member.

Further, an arrangement for balancing an engine within a craft against undesirable operational forces tending to render the craft unstable is provided. The arrangement includes a crankshaft assembly and a rotatable output shaft secured to a portion of the crankshaft assembly. A rotatable flywheel is provided in communication with the output shaft of the engine. Means are provided for imparting rotational movement to the flywheel in response to rotational movement of the output shaft. The rotational movement of the rotatable flywheel is in a direction opposite to the direction of rotation of the output shaft. The rotatable flywheel is weighted so that upon rotation of the flywheel, during engine operation, the flywheel achieves a rotational momentum to offset the rotational momentum achieved by the crankshaft assembly.

DETAILED DESCRIPTION OF THE PREFERRED EMBODIMENTS

Figure 1:
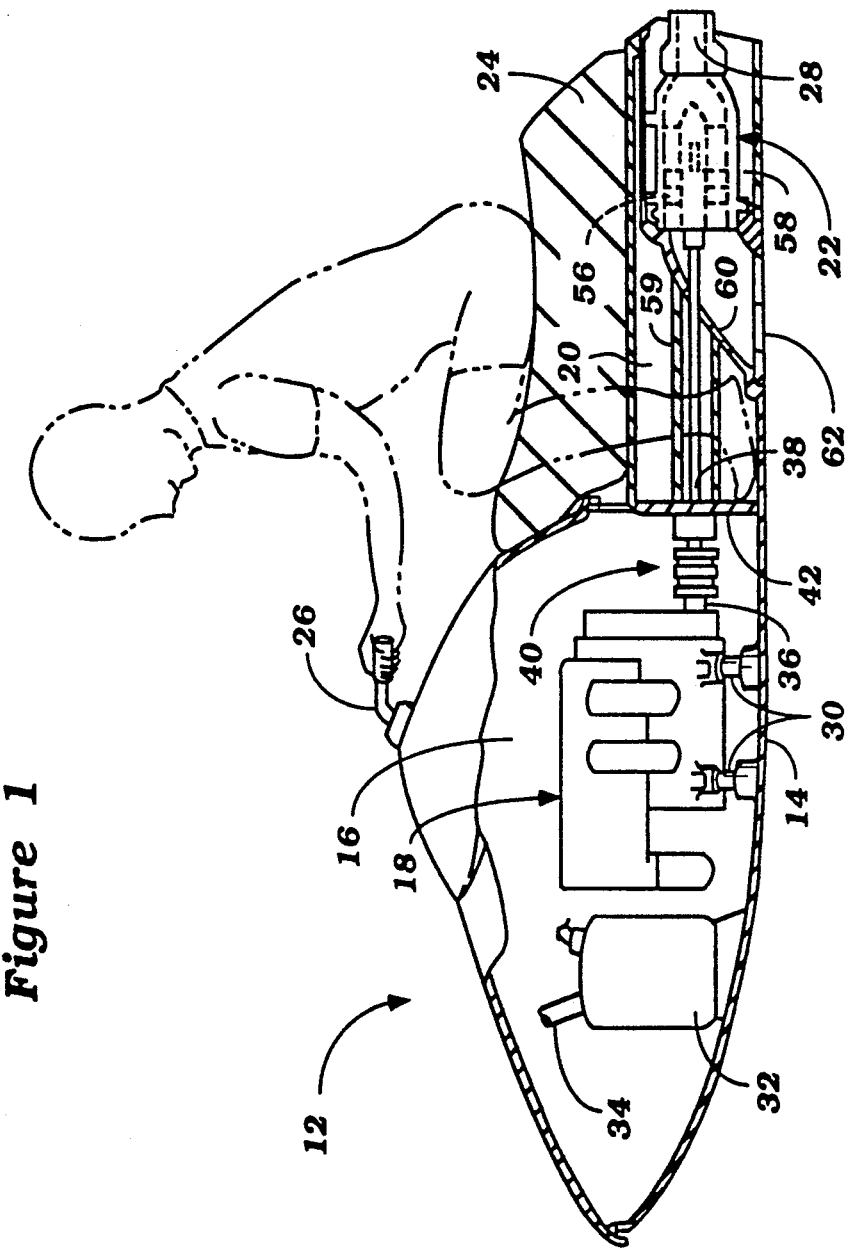
FIG. 1 is a side elevational view, with portions broken away and shown in section, of a small watercraft constructed in accordance with the invention.

A watercraft, constructed in accordance with the invention, is identified generally by the reference numeral 12 and is shown generally in FIG. 1. The watercraft is comprised of a hull assembly, indicated by the reference numeral 14, that defines an engine compartment 16 at its approximate midpoint in which an engine is located, indicated generally by the reference numeral 18, and which may be of any known type. Rearwardly of the engine compartment, the underside of the hull 14 is provided with a recess 20 that extends rearwardly and which terminates at the stern of the hull 14. A jet propulsion unit, indicated generally by the reference numeral 22, is supported within the recess for propelling the watercraft 12, in a manner to be described.

A rider's area such as a seat 24 is positioned on the hull 14 over the recess 20 and is adapted to accommodate a single rider, shown in phantom, seated in a straddle fashion. A handlebar assembly 26 is carried forwardly of the seat 24 and is coupled to a discharge nozzle 28 of the jet propulsion unit 22 for steering it and the watercraft in a known manner.

Still referring primarily to FIG. 1, the hull is provided with a plurality of spaced engine supports 30 upon which the engine 18 is mounted. The engine supports may include elastomeric vibration isolating portions, to reduce or prevent the transmission of engine vibrations to the hull. Forwardly of the engine 18, the hull 14 carries a fuel tank 32 that has a fill neck 34 that extends to a fill opening (not shown) formed at a forward portion of the hull 14. Fuel is supplied from the fuel tank 32 to the engine 18 in any known manner.

The engine 18 has an output shaft 36 that is rotatably journaled therein. Rearwardly of the engine output shaft 36 an impeller drive shaft 38 extends back toward the propulsion unit 22. A coupling 40 is provided for connecting the engine output shaft 36 to the impeller drive shaft 38, in such a manner as to dampen vibration transmission, between the two members.

Figure 2:
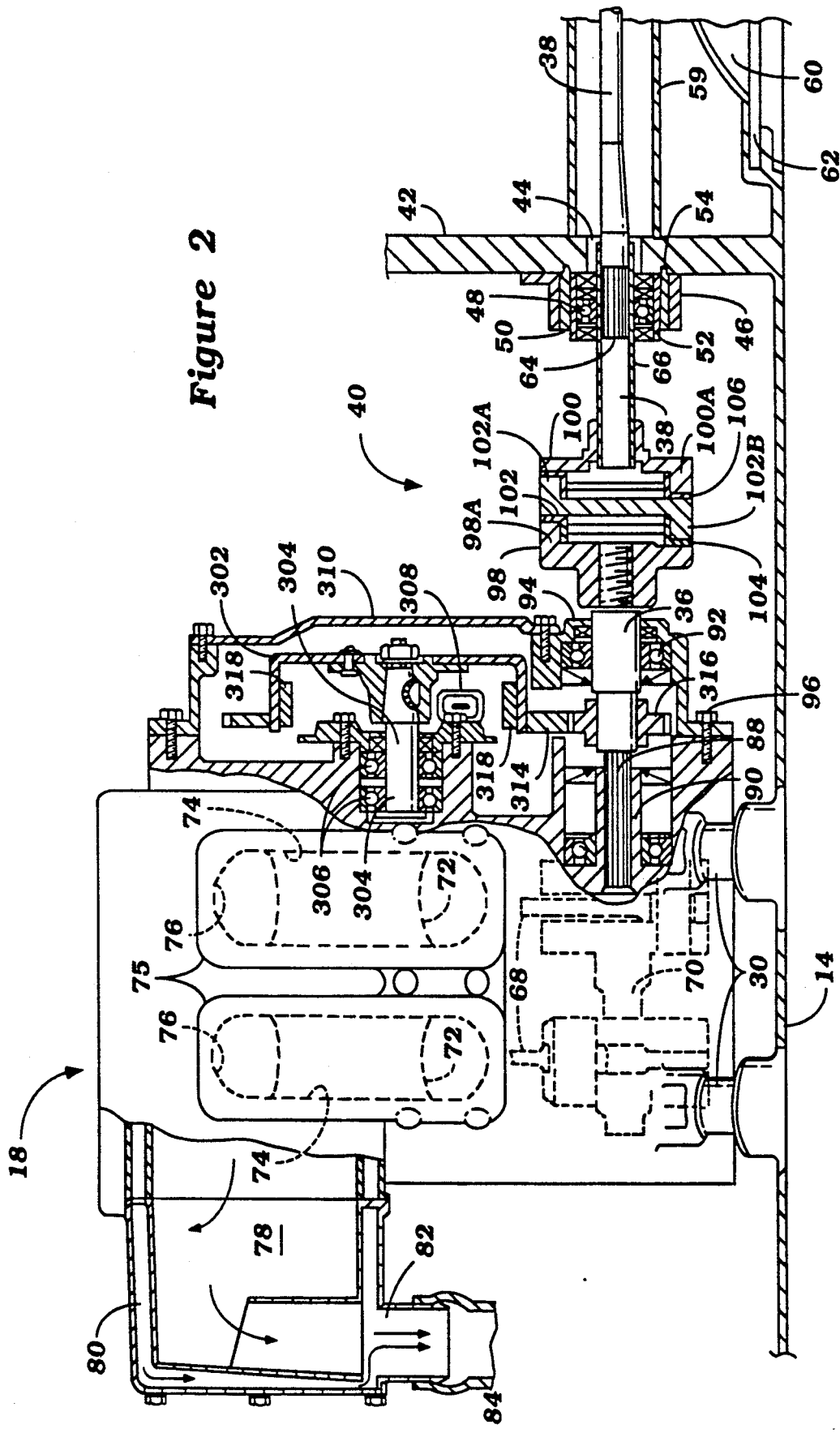
FIG. 2 is an enlarged side elevational view showing the engine and its connection to the watercraft's power transmitting shaft arrangement, and an engine balancing arrangement for the engine, in accordance with a first embodiment of the invention.
Figure 3:
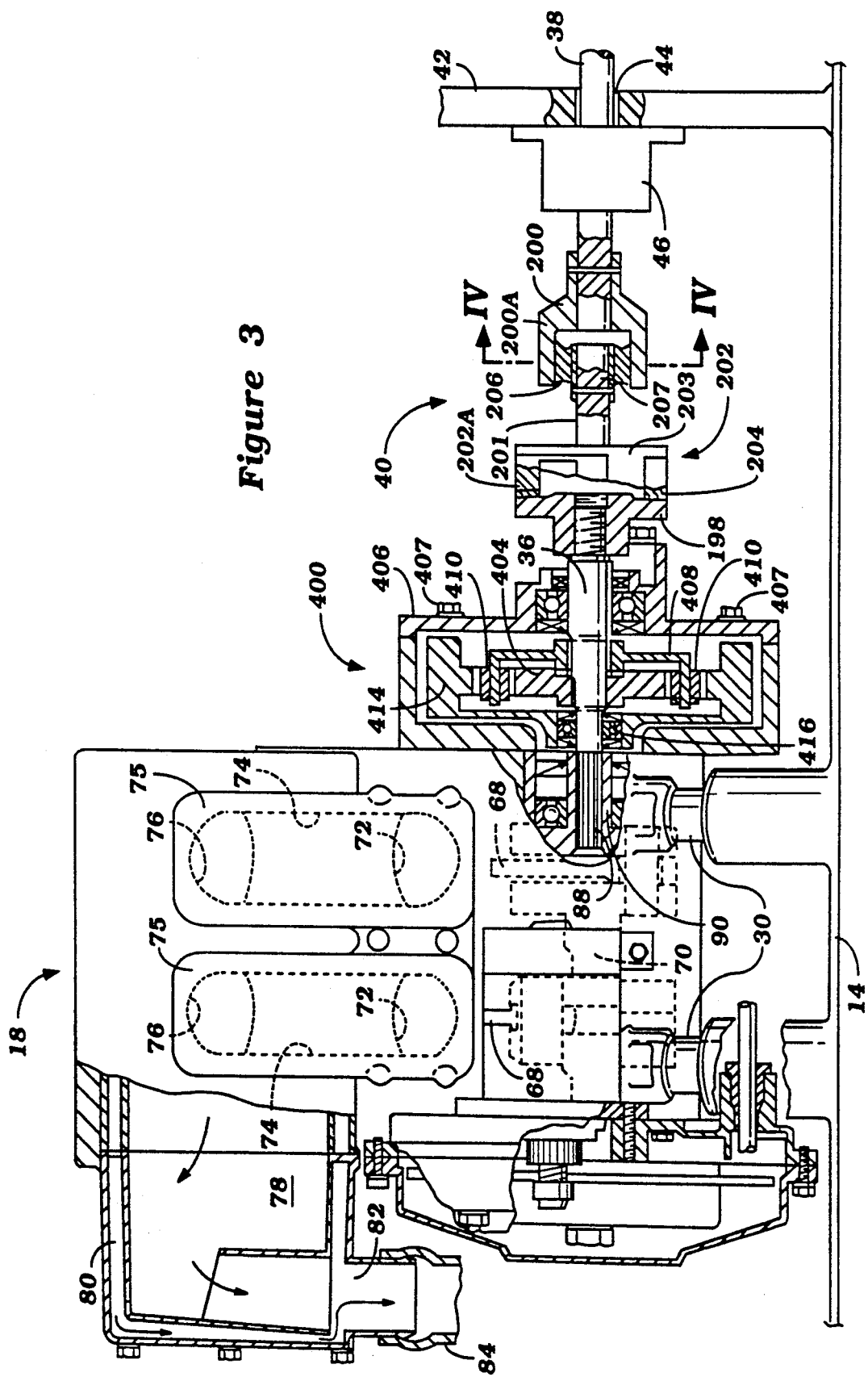
FIG. 3 is an enlarged side elevational view showing the engine and its connection to the watercraft's power transmitting shaft arrangement, and an engine balancing arrangement for the engine, in accordance with a second embodiment of the invention.

Referring now additionally to FIGS. 2 and 3, the engine compartment 16 is separated from the recess 20 by a generally vertically extending bulkhead 42 that is formed integrally with the hull 14. This bulkhead 42 is provided with an opening 44. A bearing carrier, indicated generally by the reference numeral 46, is affixed to the bulkhead 36. The bearing carrier 46 carries a pair of spaced anti-friction bearings 48 which rotatably journal the impeller drive shaft 38.

A rubber mounting 50 is interposed between the outer surface of a bearing sleeve 52 and the inner surface of the bearing carrier 46. The rubber mounting 50 further protrudes somewhat into an accommodating recess 54 within the bulkhead 36. The rubber mounting prevents vibration transmission from the drive shaft 38 to the bulkhead 42, and thus the hull 14.

The jet propulsion unit 22 is positioned rearwardly and beneath the seat 24 and includes an impeller 56, contained within a sectional housing 58, which is driven by the elongated impeller drive shaft 38 that is, in turn, connected to the engine output shaft 36 by the coupling 40. An annular sleeve 59, which encircles a portion of the impeller drive shaft 38, extends rearwardly from the bulkhead 42 towards the housing 58. The housing 58 further provides an inlet opening 60 through which water is drawn from the body in which the watercraft 12 is operated. The forward downwardly extending section of the housing 58 defines this opening 60.

An intake plate 62, having a plurality of openings, is affixed to the jet propulsion unit housing 58 across the opening of the inlet opening 60. The intake plate 62 prevents the ingestion of large articles into the inlet opening 60. The impeller 56, supported within the housing 58, draws water through the inlet opening 60 and, subsequently, discharges it through the nozzle 28 for driving the watercraft 12 in a known manner.

As shown in FIG. 2, the forward end of the impeller drive shaft 38 is provided with a male splined portion 64 that cooperates with a female portion 66 of the drive shaft 38 for providing a connection between these shaft portions, 64 and 66, so as to transmit rotary drive while permitting disassembly.

The engine may be of any suitable type, for example a two cylinder, two-cycle, in-line type, as illustrated in FIGS. 2 and 3. Although not completely detailed in the illustrations, the engine may include a cylinder block in which vertically disposed cylinder bores are formed. Pistons reciprocate within the bores, and are connected by means of connecting rods 68 to a crankshaft 70 for driving it. The crankshaft 70 is journaled within a crankcase chamber (not shown) formed by the cylinder block and by a crankcase portion that is affixed to the cylinder block in a known manner.

Exhaust gases from the individual cylinder bores are discharged through exhaust ports 72 which are formed in the cylinder block. The exhaust ports 72 communicate with curved and upwardly extending exhaust gas conduits 74. The exhaust gas conduits 74 are formed by cover plates 75 that are affixed to a face of the cylinder block. The exhaust gases are delivered by the exhaust conduits, through outlet ports 76, to a silencing device in the form of an expansion chamber 78.

A cooling water jacket 80 surrounds the expansion chamber 78. Coolant water flows from an engine cooling arrangement and through the water jacket 80, thereby cooling the exhaust gases and further aiding in silencing the operation of the engine 18. The cooling water is mixed with the exhaust gases at an outlet region 82 of the expansion chamber 78, thereby cooling the exhaust gases even further. The outlet region of the expansion chamber 78 opens into an exhaust pipe 84, which leads the exhaust gases to a location at which they are discharged from the watercraft.

Now the engine output shaft/impeller drive shaft coupling arrangement 40 of the invention will be described, with particular reference to FIGS. 2 and 3. The first embodiment of the invention is shown in FIG. 2, and will be described first.

The engine output shaft 36 extends into, and is rotatably received within, a rearwardly located lower portion of the engine 18. A forwardmost portion of the engine output shaft 36, with respect to an associated watercraft, is provided with a male splined portion 88 that cooperates with a female portion 90 of the crank shaft 70 for providing a connection between these members, so as to transmit rotary drive to the output shaft 36. A pair of bearings 92, contained within a housing member 94, which, in turn, is fastened to the engine casing by way of a threaded fastener 96, rotatably journal the engine output shaft 36 at the engine 18.

A rearwardmost end of the engine output shaft 36, located outside of, and behind, the engine 18, is provided with a threaded portion. This threaded portion of the output shaft 36 is accommodated within a threaded receiver portion of a crankshaft-side coupling member 98. A propulsion unit-side coupling member 100 is fastened to a forwardmost end of the impeller drive shaft 38. An intermediate coupling member 102 is interposed between the two aforementioned coupling members 98 and 100.

The crankshaft-side coupling 98 has a rearwardly extending projection 98A located along one of its sides. The propulsion unit-side coupling member 100 has a forwardly extending projection 100A located along one of its sides, opposite the side on which the projection 98A of the crankshaft-side coupling 98 is located. The intermediate coupling member 102 has a rearwardly extending projection 102A located proximate to the rearward projection 98A of the crankshaft-side coupling member 98 and a forwardly extending projection 102B located proximate to the forward projection 100A of the propulsion unit-side coupling member 100.

A first elastic dampening member 104 is interposed between the crankshaft-side coupling member 98 and the intermediate coupling member 102. A second elastic dampening member 106 is interposed between the propulsion unit-side coupling member 100 and the intermediate coupling member 102. Specifically, the first and second dampening members 104 and 106 line the above-mentioned projections of the three coupling members 98, 100 and 102, as shown in FIG. 2.

The first elastic dampening member 104 has a low degree of elasticity as compared to the second elastic dampening member 106, which is provided with a relatively high degree of elasticity. The first elastic dampening member 104, thus, possesses a high degree of durability due to its more rigid constitution, while the second elastic dampening member 106 provides a high measure of vibration isolation due to its softer make-up.

This coupling arrangement 40, of the first embodiment, allows a reduction in vibration transmission to the impeller drive shaft 38, while maintaining a high measure of durability. Further, the dampening members 104 and 106 in combination with the intermediate coupling member 102 are capable of functioning as a universal joint, thus aiding in keeping the shaft portions in good alignment during operation.

Figure 4:
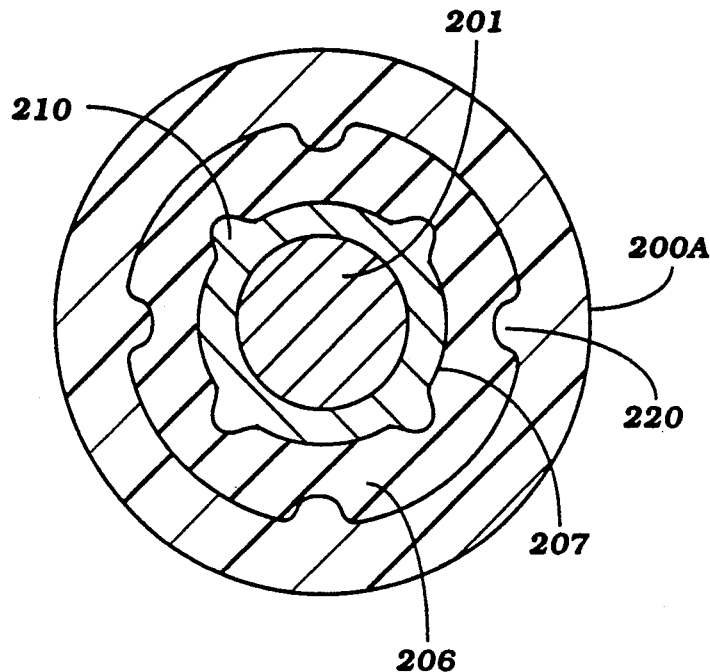
FIG. 4 is a cross-sectional view taken along the line IV—IV of FIG. 3.

Now, the second embodiment of the invention, as depicted in FIGS. 3 and 4, will be discussed. It should be noted that since many components of the second embodiment are identical to those of the first embodiment, like numerals are employed herein to indicate like components.

As in the first embodiment, the engine output shaft 36 extends, and is rotatably received, within a rearwardly located lower portion of the engine 18; and, a forwardmost portion of the engine output shaft 36 is provided with a male splined portion 88 that cooperates with a female portion 90 of the crank shaft 70 for providing a connection between these members, so as to transmit rotary drive to the output shaft 36.

A rearwardmost end of the engine output shaft 36, located outside of, and behind, the engine 18, is provided with a threaded portion. This threaded portion of the output shaft 36 is accommodated within a threaded receiver portion of a crankshaft-side coupling member 198. A propulsion unit-side coupling member 200 is fastened to a forwardmost end of the impeller drive shaft 38. An intermediate coupling member, denoted generally by the reference numeral 202, is positioned between the two aforementioned coupling members 198 and 200.

The intermediate coupling member 202, in this embodiment, comprises a rod 201 extending forwardly from the propulsion unit-side coupling member 200 and a generally disc shaped portion 203 affixed to a forwardmost end of the rod 201. The disc shaped portion 203 of the intermediate coupling member 202 is provided with a forwardly extending projection 202A along one of its sides. The propulsion unit-side coupling member 200, in this embodiment, has a cylindrical extension 200A which faces the intermediate coupling member and surrounds a portion of the rod 201 of the intermediate coupling member 202.

A first elastic dampening member 204 is interposed between the crankshaft-side coupling member 198 and the intermediate coupling member 202. A second elastic dampening member 206 is interposed between the cylindrical extension 200A of the propulsion unit-side coupling member 200 and the rod 201 of the intermediate coupling member 202. A thin cylindrical sleeve 207 is located between, and secured to, the second elastic dampening member 206 and the rod 201 of the intermediate coupling member 202. Small integrally formed projections 210 extend radially outward of the thin cylindrical sleeve 207 into the second elastic dampening member 206. Similar small integrally formed projections 220 extend inwardly of the cylindrical extension 200A into the second elastic dampening member 206. These small projections help to ensure that engine torque is efficiently transmitted from the rod 201 through the thin cylindrical sleeve 207 and the second elastic dampening member 206 to the propulsion unit-side coupling member 200.

The first elastic dampening member 204 has a low degree of elasticity as compared to the second elastic dampening member 206, which is provided with a relatively high degree of elasticity. The first elastic dampening member 204, thus, possesses a high degree of durability due to its more rigid constitution, while the second elastic dampening member 206 provides a high measure of vibration isolation due to its softer make-up.

As with the first embodiment, the coupling arrangement of the second embodiment allows a reduction in vibration transmission to the impeller drive shaft 38, while maintaining a high measure of durability. Further, the dampening members 204 and 206 in combination with the intermediate coupling member 202 are capable of functioning as a universal joint, thus aiding in keeping the shaft portions in good alignment during operation.

Now with primary reference to FIGS. 2 and 5, the balancing arrangement for the engine 18, in accordance with the first embodiment of the invention will be described. A flywheel magneto generator 302 is fastened to an axle 304 located along its central axis. The axle 304 is rotatably journaled within a bearing assembly 306 located within a rearward side of the engine 18, above the engine output shaft 36. The flywheel magneto 302 is generally disc shaped, having along its circumference a cylindrical flanged portion extending in a direction towards the engine 18. A coil arrangement 308 is provided slightly beneath the axle 304 adjacent to the magneto flywheel 302. A protective cover 310 is secured to the engine 18 to encase the flywheel magneto assembly.

A plurality of gear teeth 314 are located on the cylindrical flanged portion, around the outer perimeter, of the flywheel magneto 302. The teeth 314 are formed such that they engage another set of gear teeth 316 which are located about the circumference of the engine output shaft 36, directly below the flywheel magneto 302. Thus, as the crankshaft 70 drives the engine output shaft 36 and the gear teeth 316 revolve about the engine output shaft's longitudinal axis, the gear teeth 314, meshing with the gear teeth 316, are caused to revolve about the longitudinal axis of the axle 304. Accordingly, rotational movement is imparted to the magneto flywheel 302, as well.

Figure 5:
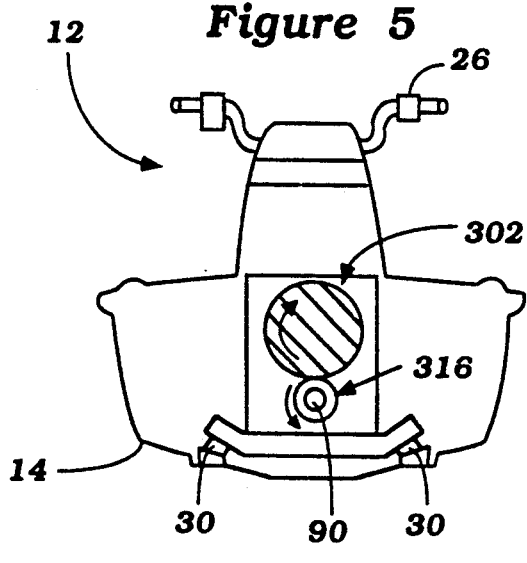
FIG. 5 is a front elevational view of an engine balancing arrangement in accordance with the first embodiment of the invention.

It should be noted that while the engine output axle 36 and its associated gear teeth 316 rotate in one rotational direction, the magneto flywheel 302 and its associated gear teeth 314 are caused to move in an opposing rotational direction, as shown in FIG. 5. Furthermore, due to the greater circumferential length about the perimeter of the magneto flywheel 302, as compared to that of the engine output shaft 36, the magneto flywheel 302 rotates at a slower rotational speed than that of the engine output shaft 36. For example, the magneto flywheel 302 could rotate at half the rotational speed of the engine output shaft 36 in a rotational direction opposite to that of the engine output shaft 36.

Weights 318 are secured to the inner surface of the cylindrical flanged portion of the magneto flywheel 302. As the magneto flywheel 302 is caused to rotate, with rotation of the engine output shaft 36, the weights provide an increased angular momentum for the magneto flywheel 302 over the angular momentum value which it would possess without the weights. Increasing the mass of weights upon the magneto flywheel would increase its moment of inertia, and accordingly would increase its angular momentum. The value of angular momentum for the magneto flywheel 302 is set to counter the angular momentum of the rotating crankshaft 70 and its related components. In this way, greater stability can be achieved for the watercraft 12, since the angular momentum of the crankshaft 70 will not be allowed to impose an undesirable rotational force upon the rest of the watercraft 12.

Figure 6:
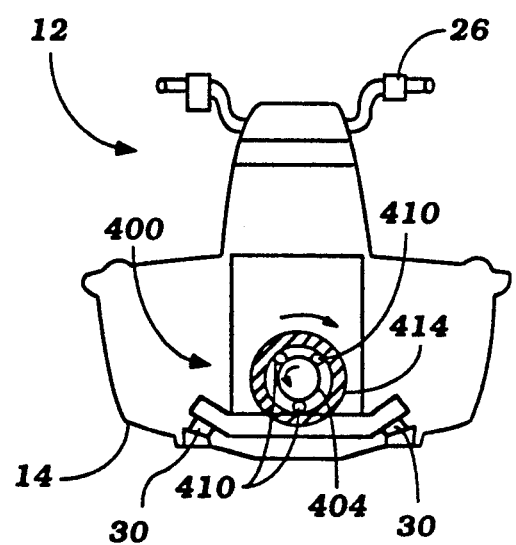
FIG. 6 is a front elevational view of an engine balancing arrangement in accordance with the second embodiment of the invention.

FIGS. 3 and 6 depict an arrangement for similarly counterbalancing the angular momentum of the crankshaft assembly 70, in accordance with the second embodiment of the invention. This function is carried out in this embodiment by way of a planetary gear arrangement, depicted generally by the reference numeral 400.

The planetary gear arrangement 400 is located within a protective cover 406 which is secured against a mating portion of the engine casing by way of threaded fasteners 407. The planetary gear arrangement 400 includes an inner sun gear 404 which is located proximate to, and about the perimeter of, the engine output shaft 36. The sun gear 404 is secured for rotational movement with the engine output shaft 36 by way of a spline connection (not shown) provided between these two members.

A carrier 408 is similarly positioned proximate to, and about the perimeter of, the engine output shaft 36. However, the carrier 408 does not rotate about the engine output shaft 36. The carrier 408 is held in a stationary position since it is affixed to the cover 406 by way of a connection (not shown) between itself and the cover member 406. A plain bearing (not shown) is provided between the interface of the carrier 408 and the engine output shaft 36.

The carrier 408 has arms extending towards the engine at its outer periphery on which planetary gears 410 are mounted for rotation. A counter-flywheel 414 is positioned about the carrier 408 and planetary gears 410. The counter-flywheel 410 is adapted for rotation about the engine output shaft 36, and is held in place with respect to the engine output shaft 36 by way of a ball bearing assembly 416.

During operation of the engine 18, as the engine output shaft 36 is driven by the crankshaft 70, the sun gear 404 is caused to rotate in the same direction as the engine output shaft 36. Along the outer periphery of the sun gear 404, sun gear teeth mesh with teeth provided along the outer periphery of the planetary gears 410, which are held in place with respect to the engine output shaft by the stationary carrier 408. Thus the sun gear 404 causes the planetary gears 410 to rotate in a direction opposite to that of the sun gear 408. The teeth of the planetary gears 410 also mesh with gear teeth provided along the interior of the counter-flywheel 414, and impart rotational movement to the counter-flywheel in a direction equivalent to that of the planetary gears 410. The directional travel of the various gears of the planetary gear arrangement 400 are shown in FIG. 6.

Increasing the mass of the counter-flywheel 414 would increase its moment of inertia, and accordingly would increase its angular momentum during rotation. The value of angular momentum for the counter-flywheel 414 is set to counter the angular momentum of the rotating crankshaft 70 and its related components. In this way, greater stability can be achieved for the watercraft 12, since the angular momentum of the crankshaft 70 will not be allowed to impose an undesirable rotational force upon the rest of the watercraft 12.

Although various embodiments of the invention have been illustrated and described, various changes and modifications may be made without departing from the spirit and scope of the invention, as defined by the appended claims.

It is claimed:

1. A balancing arrangement for an internal combustion engine comprising a crankshaft assembly; a rotatable output shaft secured to a portion of said crankshaft assembly; a rotatable flywheel in communication with said crankshaft assembly; means for imparting rotational movement to said flywheel in response to rotational movement of said crankshaft assembly, said rotational movement of said rotatable flywheel being in a direction opposite to a direction of rotation of said crankshaft assembly; said rotatable flywheel weighted so that upon rotation of said flywheel, during engine operation, said flywheel achieves a rotational momentum to offset a rotational momentum achieved by said crankshaft assembly; and further comprising an axle, upon which said flywheel is mounted, and an engine casing; wherein said axle is rotatably journaled within said engine casing at a location above said output shaft; wherein said flywheel is a magneto generator flywheel; and further comprising a first set of gear teeth, said first set of gear teeth provided around the outer periphery of said magnet generator flywheel.

2. The balancing arrangement of claim 1 further comprising a second set of gear teeth, said second set of gear teeth provided around a portion of said output shaft.

3. The balancing arrangement of claim 2 wherein said first set of gear teeth mesh with said second set of gear teeth.

4. The balancing arrangement of claim 3 wherein the circumference of said magneto generator flywheel is greater than the circumference of said output shaft, so that upon rotation of said output shaft said magneto generator flywheel is caused to rotate, via said meshing gear teeth, at a slower rotational speed than said output shaft.

5. The balancing arrangement of claim 4 wherein said magneto generator flywheel is generally disc-shaped and is provided with an annular cylindrical flange extending from its outer circumference.

6. The balancing arrangement of claim 5 further comprising a plurality of weights secured to an inner surface of said annular cylindrical flange of said magneto generator flywheel.

7. A balancing arrangement for an internal combustion engine comprising a crankshaft assembly; a rotatable output shaft secured to a portion of said crankshaft assembly; a rotatable flywheel in communication with said crankshaft assembly; means for imparting rotational movement to said flywheel in response to rotational movement of said crankshaft assembly, said rotational movement of said rotatable flywheel being in a direction opposite to a direction of rotation of said crankshaft assembly; said rotatable flywheel weighted so that upon rotation of said flywheel, during engine operation, said flywheel achieves a rotational momentum to offset a rotational momentum achieved by said crankshaft assembly; and further comprising a planetary gear assembly including a carrier member, and means fixing said carrier member in a stationary position with respect to said output shaft, so that it does not rotate thereabout.

8. The balancing arrangement of claim 7 wherein said planetary gear assembly is positioned around said output shaft.

9. The balancing arrangement of claim 8 wherein said rotatable flywheel is a rotatable outermost counter-flywheel of said planetary a gear assembly.

10. The balancing arrangement of claim 9 wherein said planetary gear assembly further includes an innermost sun gear and means securing said sun gear to said output shaft for rotation therewith; and wherein said carrier member is provided with a plurality of generally horizontally extending arms located radially beyond said sun gear, and positioned proximate thereto; a rotatable planetary gear member positioned on each of said arms of said carrier member; and an outermost ring-shaped portion of said rotatable outermost counter-flywheel, said ring-shaped portion of said rotatable outermost counter-flywheel located radially beyond said planetary gear members.

11. The balancing arrangement of claim 10 wherein said means for securing said sun gear to said output shaft comprises a spline connection between a centrally located ring-shaped portion of said sun gear and an outer portion of said output shaft.

12. The balancing arrangement of claim 11 further comprising a plain bearing positioned between said output shaft and a centrally located ring-shaped portion of said carrier member proximate to said output shaft.

13. The balancing arrangement of claim 12 wherein said sun gear is provided with gear teeth about its outer periphery; each planetary gear member is provided with gear teeth about its outer periphery; and said ring-shaped portion of said outermost counter-flywheel is provided with gear teeth along an innermost side of its periphery; said sun gear teeth meshing with said gear teeth of said planetary gears, and said outermost counter-flywheel gear teeth also meshing with said gear teeth of said planetary gears.

14. The balancing arrangement of claim 13 further comprising a an engine casing and a protective cover; said cover attachable to said engine casing so that said planetary gear assembly is encased in a region therebetween.

15. The balancing arrangement of claim 14 wherein said means fixing said carrier in a stationary position with respect to said output shaft, so that it does not rotate thereabout, comprises a direct connection between said carrier and said protective cover.

16. A balancing arrangement for an internal combustion engine comprising a crankshaft assembly; a rotatable output shaft secured to a portion of said crankshaft assembly; a rotatable flywheel in communication with said crankshaft assembly; means for imparting rotational movement to said flywheel in response to rotational movement of said crankshaft assembly, said rotatable flywheel rotated at a fixed speed ratio with respect to rotation of the crankshaft assembly and in a direction opposite to a direction of rotation of said crankshaft assembly; said rotatable flywheel weighted so that upon rotation of said flywheel, during engine operation, said flywheel achieves a rotational momentum of a quantity to substantially offset a rotational momentum achieved by said crankshaft assembly; wherein said balancing arrangement is embodied in a watercraft, said watercraft having a hull and an impeller, wherein said impeller is positioned within said hull; said watercraft further having an impeller drive shaft and means operatively connecting said impeller drive shaft to said crankshaft assembly; and wherein said rotatable flywheel is located at least as high above said hull as a generally horizontal axis of rotation of said output shaft; and wherein said rotatable flywheel and said crankshaft assembly are positioned along the center of said hull; wherein said flywheel is located concentrically about said output shaft.

* * * * *